(12) United States Patent
Carpenter et al.

(10) Patent No.: US 6,938,479 B2
(45) Date of Patent: Sep. 6, 2005

(54) SENSING DEVICE FOR MEASURING VOLUME, POSITION, OR MASS OF MATTER

(76) Inventors: Randy Val Carpenter, 853 Redrock Rd., St. George, UT (US) 84770; Val Carpenter, 853 Redrock Rd., St. George, UT (US) 84770

(*) Notice: Subject to any disclaimer, the term of this patent is extended or adjusted under 35 U.S.C. 154(b) by 0 days.

(21) Appl. No.: 10/640,185

(22) Filed: Aug. 12, 2003

(65) Prior Publication Data

US 2004/0031329 A1 Feb. 19, 2004

Related U.S. Application Data

(60) Provisional application No. 60/403,091, filed on Aug. 12, 2002.

(51) Int. Cl.[7] .............................................. G01F 23/00
(52) U.S. Cl. .................................. 73/304 C; 73/304 R
(58) Field of Search ........................... 73/304 C, 304 R

(56) References Cited

U.S. PATENT DOCUMENTS

| | | | | |
|---|---|---|---|---|
| 2,354,964 A | * | 8/1944 | Ostermann et al. ........ | 73/304 C |
| 3,832,900 A | * | 9/1974 | Ross ......................... | 73/290 R |
| 4,122,718 A | * | 10/1978 | Gustafson ................. | 73/304 C |
| 4,301,681 A | * | 11/1981 | Maltby et al. ............. | 73/304 C |
| 4,864,857 A | * | 9/1989 | Koon ......................... | 73/304 C |
| 4,879,902 A | * | 11/1989 | Loniello .................... | 73/304 R |
| 5,669,263 A | * | 9/1997 | Borchers et al. .......... | 73/304 R |
| 5,861,811 A | * | 1/1999 | Lease et al. ................ | 340/618 |

OTHER PUBLICATIONS

3720K3, 2003, Oil—Gauging Measuring Tapes, McMaster–Carr: p. 2040 Catalog.
43306–00, 2003, Level Switch System Float, Flowline Catalog p. 122.
43306–10, 2003, Level Switch System Ultrasonic, Flowline p. 122 Catalog.
43307–20, 2003, Level Switch System Tuning Fork, Flowline Catalog p. 122.
43309–20, 2003, Triple–Point Remote Relay Switch, Flowline Catalog p. 123.
43299–10, 2003, Point Level Switch and Controller, Flowline Catalog p. 124.
43299–12, 2003, RF Capacitance Level Switch, Flowline p. 125 Catalog.
43311–00, 2003, Ultrasonic Level Transmitter, Flowline p. 126 Catalog.
43312–00, 2003, Level Transmitter, Flowline p. 127 Catalog.

* cited by examiner

Primary Examiner—Michael Cygan

(57) ABSTRACT

A novel sensing device having a unique structure, for measuring volume, position or mass of matter (11) comprising of a housing (12) having a removable top (13), a permanent bottom (14), an electronic oscillator board (15) having plurality of electronic components for measuring volume, position, or mass of matter. A coax type wire (16) having a first end (17) connected to said electronic oscillator board (15) and a second end (18) terminating at the bottom of receiver hole (20). A retainer (19) used to form said receiver hole (20) having a top end (21) open to said permanent bottom (14) on said housing (12) to accommodate said coax type wire (16). Said receiver hole 20 having a bottom end (22) and lower end (25) being isolated by said non-conductive material (23). Said non-conductive material (23) having an upper end (24) being attached by mounting means (26) to said permanent bottom (14) of housing (12).

4 Claims, 2 Drawing Sheets

US 6,938,479 B2

SENSING DEVICE FOR MEASURING VOLUME, POSITION, OR MASS OF MATTER

This application claims priority from provisional application No. 60/403,091, filed on 12 Aug. 2002.

BACKGROUND

DESCRIPTION OF PRIOR ART

Prior art sensors are ultra sonic, pressure transducer, pressure switch, float and pulley, float and switch type sensors. The prior art sensors are more complex and the cost is much greater to manufacture and are not as reliable as my invention. The benefits over prior art is my invention is designed to be used as low cost and highly reliable on small rural water systems which could accurately measure and control the levels of water in a storage tank. Unlike prior art sensors, my invention can be totally enclosed which would make it less susceptible to moisture problems, also my invention is all solid state and has no moving parts to wear out, rust, seize or build up materials that would cause it to quit working.

Prior art sensors are less accurate than my invention. My invention sensor is much higher in accuracy than many of the prior art which do well to accurately measure two to three inches whereas my invention is accurate within a tenth of an inch in volume along the length of the sensor.

Prior art sensors are not as versatile as my invention. My invention can be used to sense many types of materials, its main use is for measuring water level in storage tanks, but unlike prior art sensors, it can also measure materials such as, many types of liquids that may be corrosive or volatile. My invention can be used for measuring powder or granular levels in silos, unlike many prior art sensors the output from my invention can be interpreted into a digital signal that can be used as data for computer systems or transmitted long distances for remote monitoring.

Many prior art sensors require access to the bottom of a storage tank or silo to be made, such as a pressure transducer. My invention only needs a small opening at the top of the tank to be introduced into the tank. This is a great advantage over prior art sensors.

My invention requires a simple construction making the cost of manufacturing relatively low compared to other prior art sensors. It requires no exotic materials and only simple tooling to create.

OBJECTS AND ADVANTAGES

Accordingly, besides the objects and advantages described above, several objects and advantages of my invention are:

(a) to provide a sensing device that is more compact, without reducing its ability to be placed in a very small area which has been limited with prior art.

(b) to provide a more accurate way of determining the water level in water storage tank and other applications.

(c) to provide a sensor by positioning the sensor over an object the sensor is able to measure its mass.

(d) to provide a sensor that can be used in weighing and sorting systems in industry or other applications.

(e) to provide a sensor that can be used to sense the perimeter of objects to it. Such as, if it were placed in a wall, floor, or door jam, it could be used to determine if someone was passing through the area or if an object was within the general location of the sensor.

It is an object of the present invention to provide an improved sensing device for measuring volume, position or mass of matter.

Other objects and features are readily apparent from the following description of certain preferred embodiments, thereof, taken in conjunction with the accompanying drawing although variations and modifications may be affected without departing from the sphere and the scope of the normal concepts of the disclosed invention. You will find further objects and advantages of the invention from a consideration of the ensuing descriptions and accompanying drawings.

DRAWING FIGURES

DRAWING REFERENCE NUMERALS

Figure 1:
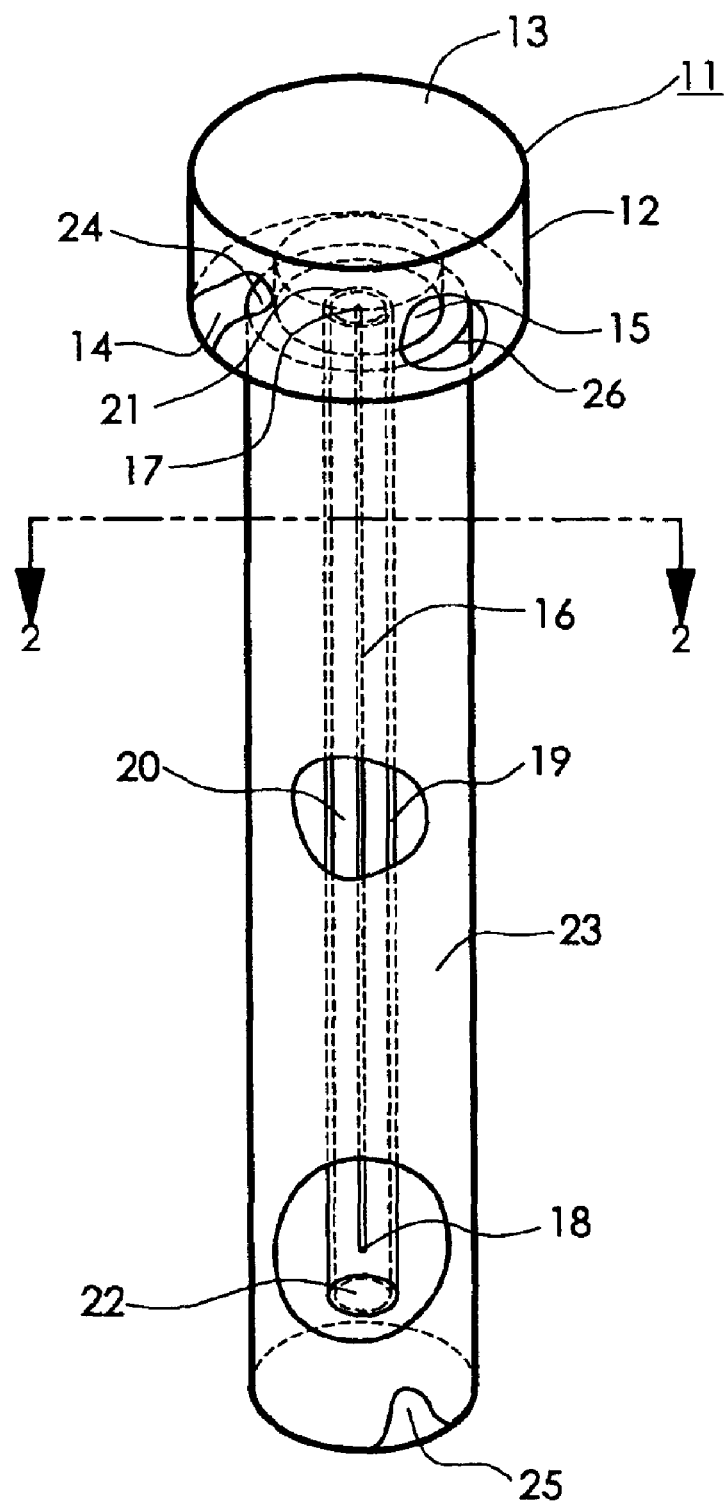
FIG. 1 Shows a perspective view of a sensing device in accordance with the invention.

11 Sensing device
12 housing
13 removable top
14 permanent bottom
15 electronic oscillator board
16 coax type wire
17 first end
18 second end
19 retainer
20 receiver hole
21 top end
22 bottom end
23 non-conductive material
24 upper end
25 lower end
26 mounting means

DESCRIPTION OF INVENTION

Figure 2:
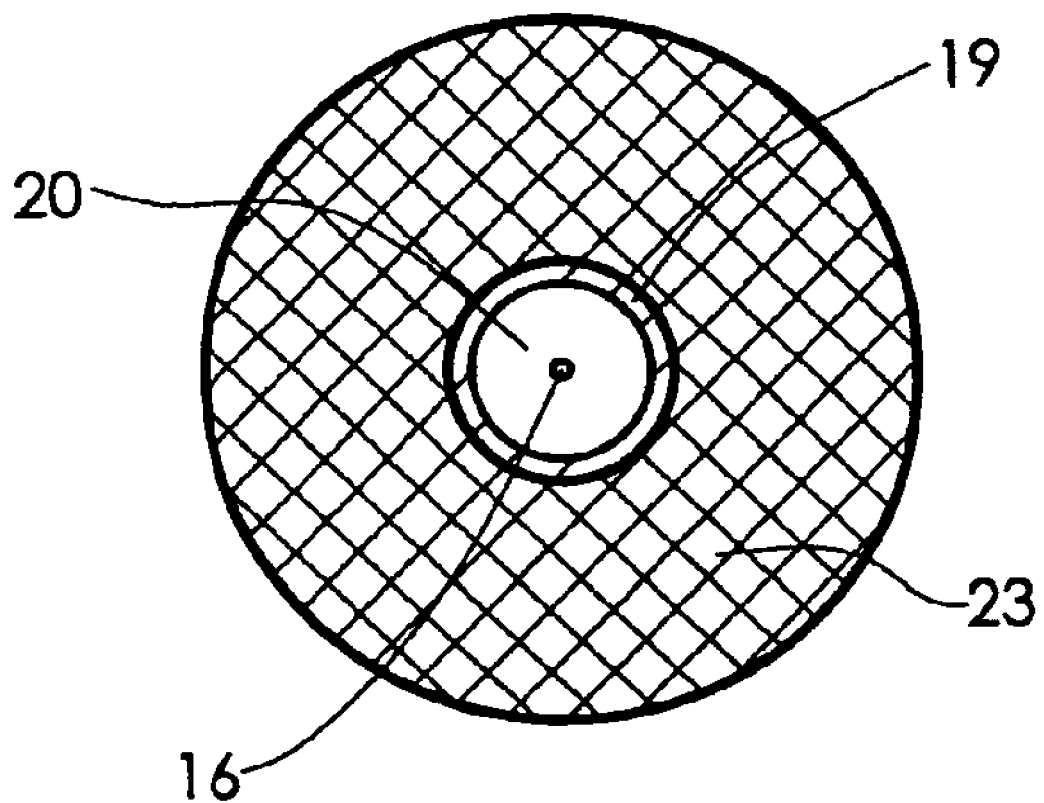
FIG. 2 Shows a cross-sectional view of the non-conductive material taken along the line 2—2 FIG. 1 area having the retainer and receiver hole with a coax type wire in the receiver hole.

The sensing device for measuring volume, position, or mass of matter shown in FIG. 1, comprises of a housing 12 having sufficient height, width and length, having the following features: a removable top 13 having sufficient thickness, width and length. Said removable top 13 when in the closed position having sufficient means to be air, dust, and watertight. A permanent bottom 14 having sufficient thickness, width and length. Said housing 12, accommodates an electronic oscillator board 15, having sufficient thickness, width and length and having sufficient electronic components for measuring volume, position or mass of matter. A coax type wire 16 shown in FIG. 1 and FIG. 2 having sufficient size and length positioned in the receiver hole 20 shown in FIG. 1 and FIG. 2 having sufficient width and length to accommodate said coax type wire 16. Said coax type wire 16 having a first end 17, connected to said electronic oscillator board 15, and a second end 18 terminates having sufficient space from the bottom of said receiver hole 20. Said receiver hole 20 is formed by retainer 19 having sufficient size at the time the non-conductive material 23 having sufficient thickness, width and length is formed around said retainer 19. Said receiver hole 20 having a top end 21 open to the said permanent bottom 14 on said housing 12 to accommodate said coax type wire 16. Said receiver hole 20 having a bottom end 22 having a solid area between said bottom end 22 and lower end 25 of said non-conductive material 23. Said non-conductive material 23 having an upper end 24 being attached by mounting means 26 to said permanent bottom 14 of said housing 12.

CONCLUSION AND SCOPE OF INVENTION

Accordingly, the reader will see that the sensing device for measuring volume, position or mass of matter of this invention has the ability to provide a more compact sensing device. Furthermore, the sensing device has the additional advantages in that:

- it provides the ability for a single wire to be a conductor or a plurality of conductors in a sufficient manner encased in a non-conductive material. The conductor or conductors are arranged in such a way that they have an electrical capacitance between them and this is used as the capacitor for an oscillator circuit. As matter is placed around, inside, within the proximity, or along the length of the sensor, it will cause the relative capacitance of the conductor or conductors to change, which changes the rate at which the conductors charge and discharge in the sensor, which in turn causes the oscillator's frequency to change, which is timed and measured to produce an output. This output will vary with respect to the amount of mass that comes into place around, in or over the length of the sensor, which is interpreted through a computer or control system as the measured output of the sensor which can be used as data for computer systems, displays, control system, etc.
- allows the oscillator output to be used to produce a pulse out with respect to the frequency of the oscillator. There are many ways to accomplish this and many different components that can be used. As a result, I do not wish to limit the scope of this invention to one particular set of electronics to cause the sensor to work.
- this invention is the combination of positioning of the conductors used in the sensor relative to its particular application and the oscillator circuit that uses the electrical capacitance of the conductors to produce a system for measuring volume, position, or mass of matter.
- to provide a way to measure or sense the volume or mass of different kinds of matter such as but not limited to water, liquid or powdered chemicals stored in holding tanks, silos, ponds, lakes, or any kind of container natural or manmade.
- to provide a way to measure the mass of size of objects by rising the same sensor over said object or to cause said object to pass through the sensor, which would cause the sensor to sense its size or mass.
- to be used as a proximity sensor to sense or measure the distance or proximity of the sensor to an object or a mass.

Although the description above contains many specifications, these should not be construed as limiting the scope of the invention but merely providing illustrations of some of the presently preferred embodiments of this invention. For example, the sensing device housing and non-conductive material can have other shapes such as square, oval, trapezoidal, triangular, etc. Different combinations of material can be used such as wood, plastic, rubber, metals, etc. Thus, the scope of the invention should be determined by the appended claims and their legal equivalents, rather than by the examples given.

What is claimed is:

1. A device for sensing material level in a vessel comprising:

a top member containing an electronic oscillator board;

a bottom non-conductive hollow elongated member mounted to the top member, wherein said bottom member contains therein a hollow elongated retainer, said retainer containing therein a coaxial wire having a first end connected to said electronic oscillator board and a second end terminating near the bottom end of said hollow elongated retainer.

2. The device of claim 1, wherein said top member is air-, dust-, and water-tight.

3. The device of claim 1, wherein said electronic oscillator board outputs a pulse with respect to the oscillator frequency, said frequency responsive to changes in the electrical capacitance of said coaxial wire.

4. The device of claim 1, wherein said top member is removable and comprises a permanent bottom member mounted to said bottom member.

* * * * *